United States Patent
Scavarda

(10) Patent No.: US 8,904,897 B2
(45) Date of Patent: Dec. 9, 2014

(54) DEVICE FOR LOCKING A MOTOR-VEHICLE GEAR CHANGE IN A PARKING POSITON

(75) Inventor: Mario Scavarda, Turin (IT)

(73) Assignee: Fiat Powertrain Technologies S.p.A., Turin (IT)

( * ) Notice: Subject to any disclaimer, the term of this patent is extended or adjusted under 35 U.S.C. 154(b) by 282 days.

(21) Appl. No.: 13/533,418

(22) Filed: Jun. 26, 2012

(65) Prior Publication Data

US 2013/0133458 A1     May 30, 2013

(30) Foreign Application Priority Data

Nov. 24, 2011   (EP) .................................... 11190469

(51) Int. Cl.
*F16C 1/12*   (2006.01)
*G05G 5/00*   (2006.01)

(52) U.S. Cl.
USPC .................. 74/473.15; 74/473.21; 74/473.25; 74/500.5

(58) Field of Classification Search
CPC ......... F16H 59/10; F16H 59/02; F16H 63/18; B60K 20/00
USPC ................. 74/473.1, 473.13, 473.15, 473.21, 74/473.25, 473.3, 500.5, 502.6
See application file for complete search history.

(56) References Cited

U.S. PATENT DOCUMENTS

| | | | | |
|---|---|---|---|---|
| 1,281,043 A | * | 10/1918 | Magner | 74/489 |
| 1,511,261 A | * | 10/1924 | Brown | 74/489 |
| 1,556,411 A | * | 10/1925 | Brown | 74/489 |
| 1,834,724 A | * | 12/1931 | Nisbet | 74/489 |
| 2,788,676 A | * | 4/1957 | Spexarth | 74/489 |
| 5,588,331 A | * | 12/1996 | Huang et al. | 74/489 |
| 5,970,816 A | * | 10/1999 | Savard | 74/489 |
| 7,770,490 B1 | * | 8/2010 | Weiss | 74/502.2 |
| 8,151,666 B1 | * | 4/2012 | Kraus | 74/488 |
| 8,162,340 B2 | * | 4/2012 | Patterson | 280/261 |
| 8,490,509 B2 | * | 7/2013 | Giefer et al. | 74/473.25 |
| 2011/0132121 A1 | | 6/2011 | Park et al. | |

FOREIGN PATENT DOCUMENTS

| | | |
|---|---|---|
| DE | 10 2010 054 911 A1 | 8/2011 |
| EP | 0 571 274 A1 | 11/1993 |
| EP | 2 275 719 A1 | 1/2011 |
| JP | 2006 322489 A | 11/2006 |

OTHER PUBLICATIONS

EPO From 1507N—European Search Report for corresponding European Application No. EP11190469 completed on Apr. 5, 2012, and dated on Apr. 16, 2012.

* cited by examiner

*Primary Examiner* — David M Fenstermacher
(74) *Attorney, Agent, or Firm* — Heslin Rothenberg Farley & Mesiti P.C.; Victor A. Cardona, Esq.

(57) ABSTRACT

A device for controlling a device for locking a motor-vehicle gear change in a parking condition includes a transmission which connects the gear change lever to a driven member movable between an operative position and an inoperative position, respectively for engagement and disengagement of the locking device. The transmission is connected to the driven member through a rotatable drum with a cylindrical surface having a cam-track cooperating with a cam-following element. The cam-track is designed so as to cause engagement of the locking device when the transmission is subjected to a pulling action or to a pushing action, depending upon the requirements.

12 Claims, 5 Drawing Sheets

DEVICE FOR LOCKING A MOTOR-VEHICLE GEAR CHANGE IN A PARKING POSITON

CROSS REFERENCE TO RELATED APPLICATIONS

This application claims priority from European Patent Application No. 11190469.4 filed on Nov. 24, 2011, the entire disclosure of which is incorporated herein by reference.

The present invention refers to motor-vehicle gear changes and relates in particular to a device for controlling a system for locking the gear change in a parking position. In automatic or robotized gear changes, the gear change control lever has a parking position, in which the gear change becomes mechanically locked. This locking is typically obtained through a locking device for example in form of a ratchet device adapted to engage and lock a gear of the gear change or a gear of the differential which is arranged at the output of the gear change. Engagement and disengagement of the locking device is controlled by an actuating member associated with the gear change, which is controlled by the gear change lever through a mechanical transmission, for example including a flexible cable transmission.

FIGS. 1-3 of the annexed drawings show a known device of the above indicated type which has been developed in the past by the applicant itself. This device comprises a mechanical control which in this specific case includes a flexible cable transmission 1. The flexible cable transmission 1 connects the gear change lever 2 to a driven member 3, which is movable between an operative position and an inoperative position, respectively for engagement and disengagement of the device for locking the gear change in the parking condition. In FIG. 1, reference numeral 4 generally designates the motor-vehicle gear change, which can be of any known type, in particular a robotized gear change. The actuator 3 has an outer body rigidly connected to the casing 4a of the gear change and an inner movable part 3a connected to the device for locking the gear change, which is arranged inside casing 4a of the gear change 4.

In the annexed drawings, the parking locking device is not shown, since this device can be made in any known way and does not fall, taken alone, within the scope of the present invention. The deletion of the constructive details of the locking device also renders the drawings more simple and easier to understand.

According to the conventional technique, as indicated above, the locking device is for example constituted by a ratchet device which locks a gear of a differential associated to the output of the gear change or an inner gear of the gear change.

With reference to FIGS. 1, 2, the gear change lever 2 is pivotally mounted around a horizontal axis 5, transverse with respect to the longitudinal direction of the motor-vehicle, onto a supporting structure 6 anchored to the motor-vehicle floor panel. In the case of the illustrated example, lever 2 is rotated forwardly (with reference to the direction A of movement of the vehicle indicated in FIG. 1) for reaching the parking position. This movement corresponds to a rearward movement of the lower end 2a of the lever, which is connected to a support 7 to which one end of the flexible cable transmission 1 is anchored.

With reference to FIG. 3, the opposite end of the flexible cable transmission 1 is connected to the end of a first crank lever 8 connected in rotation to one end of a shaft 9 rotatably supported within a bracket 10 anchored by means of screws 11 to the casing 4a of the gear change. The opposite end of the shaft 9 carries a second crank lever 12 whose end far away from shaft 9 is connected to the driven member 3a of the actuating device 3 by means of an arm 30. The driven member 3a is connected to the locking device of the gear change so that it controls engagement and disengagement thereof.

As clearly apparent from the foregoing description, in the case of the illustrated example (which relates to a motor-vehicle to be marketed in Europe) the control device according to the conventional art has lever 2 which applies a pulling force to the flexible cable transmission 1 when the parking locking device is engaged, whereas the lever applies a pushing action to the flexible cable transmission 1 when the locking device must be disengaged. In some cases, and in particular in motor-vehicles which must travel in the United States, the regulations provide that the flexible cable transmission 1 must be subjected to a pushing action when the locking device is engaged and to a pulling action in case of disengagement. This implies the need of providing two different mechanical transmissions depending upon where the motor-vehicle is to be marketed, with resulting costs and need of more storing space.

The object of the present invention is that of overcoming the above mentioned drawback, by providing a control device which is adapted to be easily transformed to operate according to any of the above described different modes.

A further object of the invention is that of providing a control device which in any case is of simple construction, inexpensive and of reduced bulk.

In view of achieving these objects, the invention provides a control device having the features which have been indicated at the beginning of the present description and further characterized in that said transmission comprises a rotatable drum with a cylindrical surface having a cam-track cooperating with a cam-following element.

Due to this feature, the device can be easily and rapidly adapted to operate in the two different modes which have been described above (i.e. with the transmission subjected to a pulling or pushing action when the locking device is engaged) by simply providing a drum with a cam-track having a first orientation and a drum with a cam-track having a second orientation. The different operative mode is therefore obtained simply by adopting one or the other type of drum. In this manner, simplicity and low cost of production are ensured, since all the parts of the device remain identical in the two cases, and only the component constituted by said drum must be provided in two different versions in order to adapt the device to operate according to the two different modes. Also the dimensions of the entire device remain unvaried in the two cases, which ensures that the system can be adapted to operate in one way or the other. Finally, also the warehouse expenses are consequently reduced.

BRIEF DESCRIPTION OF THE DRAWINGS

Further features and advantages of the invention will become apparent from the description which follows with reference to the annexed drawings, given purely by way of non-limiting example, in which.

DETAILED DESCRIPTION OF THE INVENTION

Figure 1:
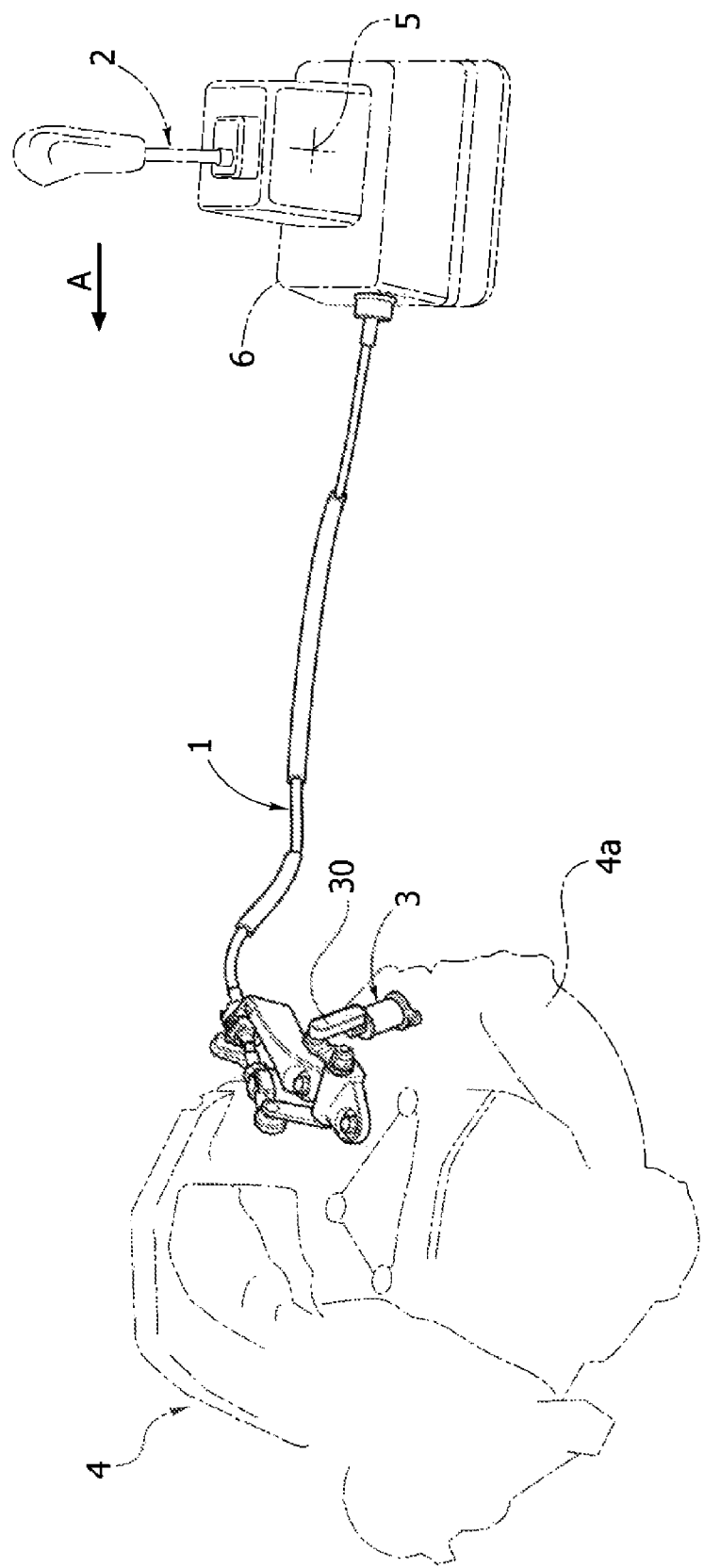
FIGS. 1-3, which have been already described above, show a control device according to the prior art.
Figure 2:
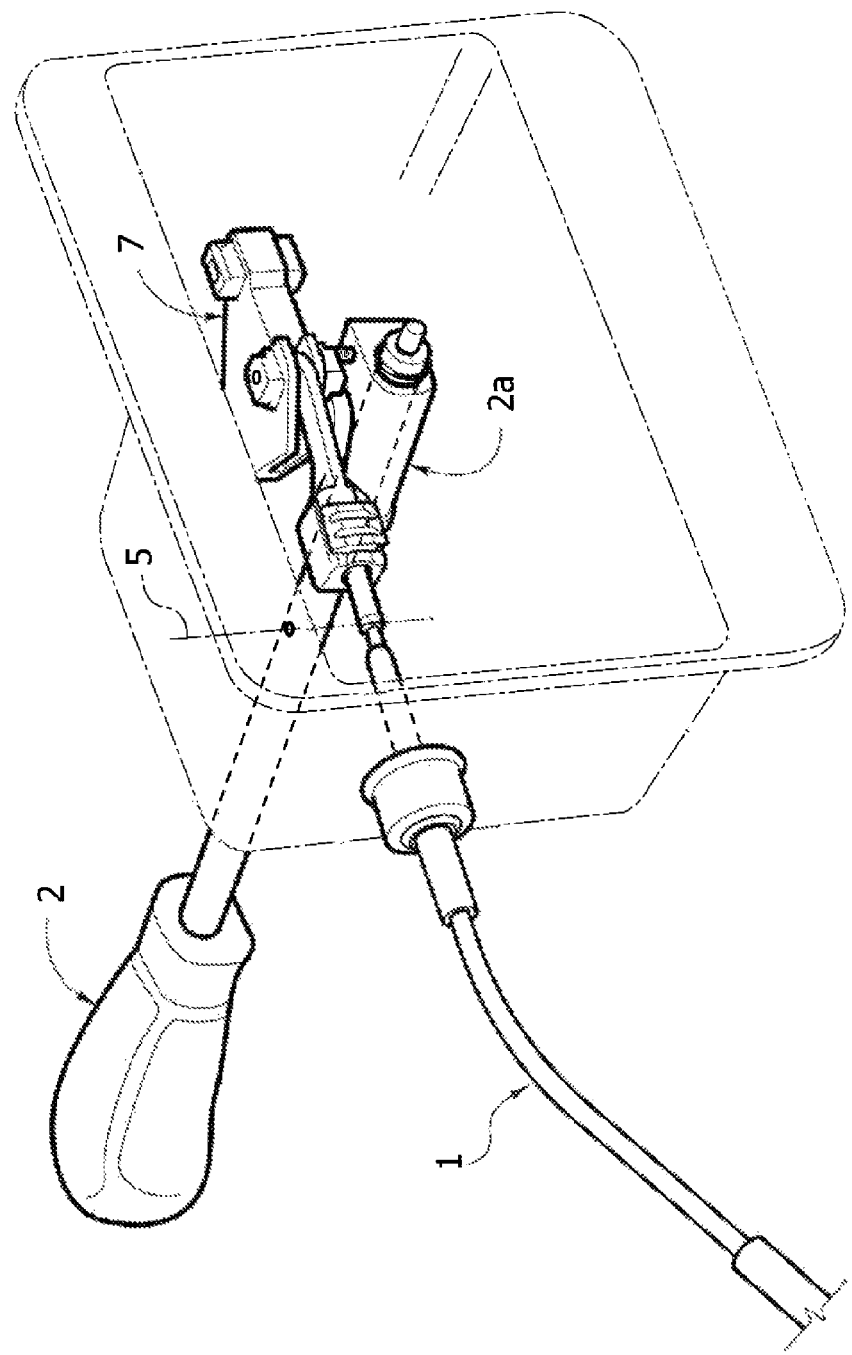
Figure 3:
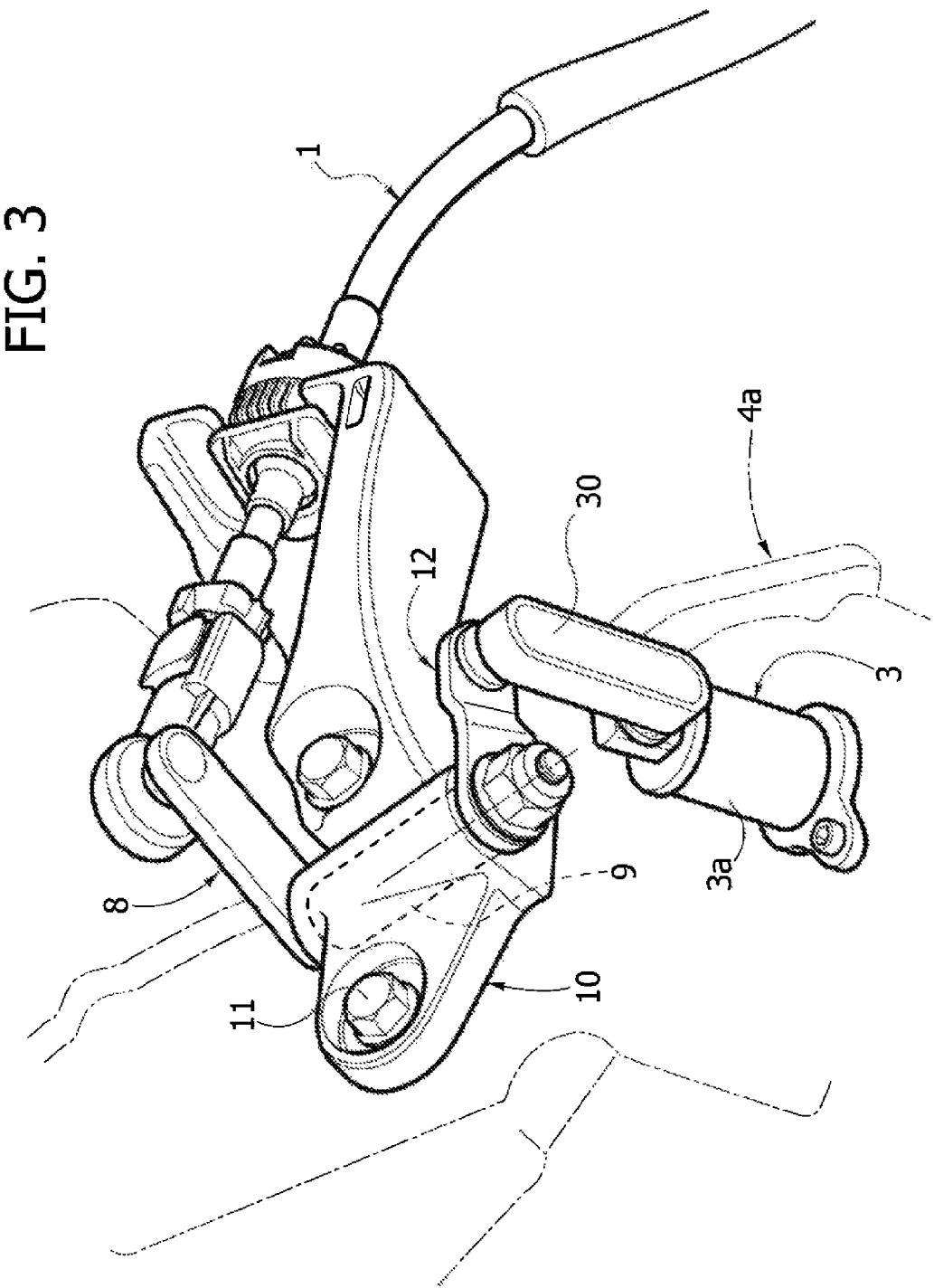

In FIGS. 4-7, the parts in common with those of FIGS. 1-3 are designated by the same reference numerals. In the case of the invention, the mechanical transmission 1 may be of any known type adapted to connect the control lever 2 to the driven member which is associated with the locking device. In particular, transmission 1 may be a flexible cable transmission, such as in the case of the known solution shown in FIGS. 1-3. Furthermore, also the part of the device associated with a gear change lever 2 may be of any known type and, by example, as in the specific case illustrated herein, it may be absolutely identical to that provided according to the prior art and shown in FIG. 2. The device according to the invention differs instead from the device according to the prior art at the end of the transmission 1 connected to the driven member 3. In this case, indeed, there is no provision of the rotatable shaft 9 with the two crank levers 8, 12. The driven member 3a is rigidly connected by means of an adjustable rod 13 to a body 14 carrying a cam-following pin 15 which is received within a cam-track 16, in form of a shaped groove, formed on the outer cylindrical surface 17 of a drum 18 which is rotatably supported around an axis 19 (FIG. 5) by a bracket 20 connected to the casing 4a of the gear change. The drum 18 is connected at a peripheral area thereof, by means of a joint 21, to the end of the control transmission 1, so that the rotation of the gear change lever 2 around the axis 5 causes a rotation of the rotatable drum 18 around the axis 19. The rotation of the rotatable drum 19 causes a translation along the axial direction Y (see FIG. 4) of the cam-following pin 15 and the rod 13, with a resulting displacement of the driven member 3a.

Figure 6:
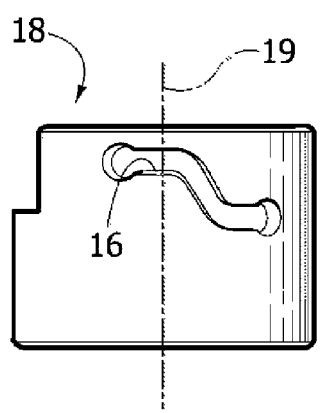
FIGS. 6, 7 are side views of the rotatable drum, both in the first version and in the second version which are respectively adapted to the two different operating modes of the device.
Figure 7:
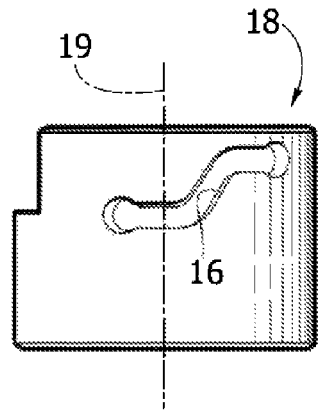

Drum 18 is provided in two different versions, respectively visible in FIGS. 6, 7, which differ from each other only for the orientation of the cam-track 16. This orientation is chosen so as to obtain engagement of the locking device by a forward or a rearward rotation, respectively, of the gear change lever 2, depending upon whether the device is to be installed on vehicles which are to be marketed in Europe or in the United States.

Figure 4:
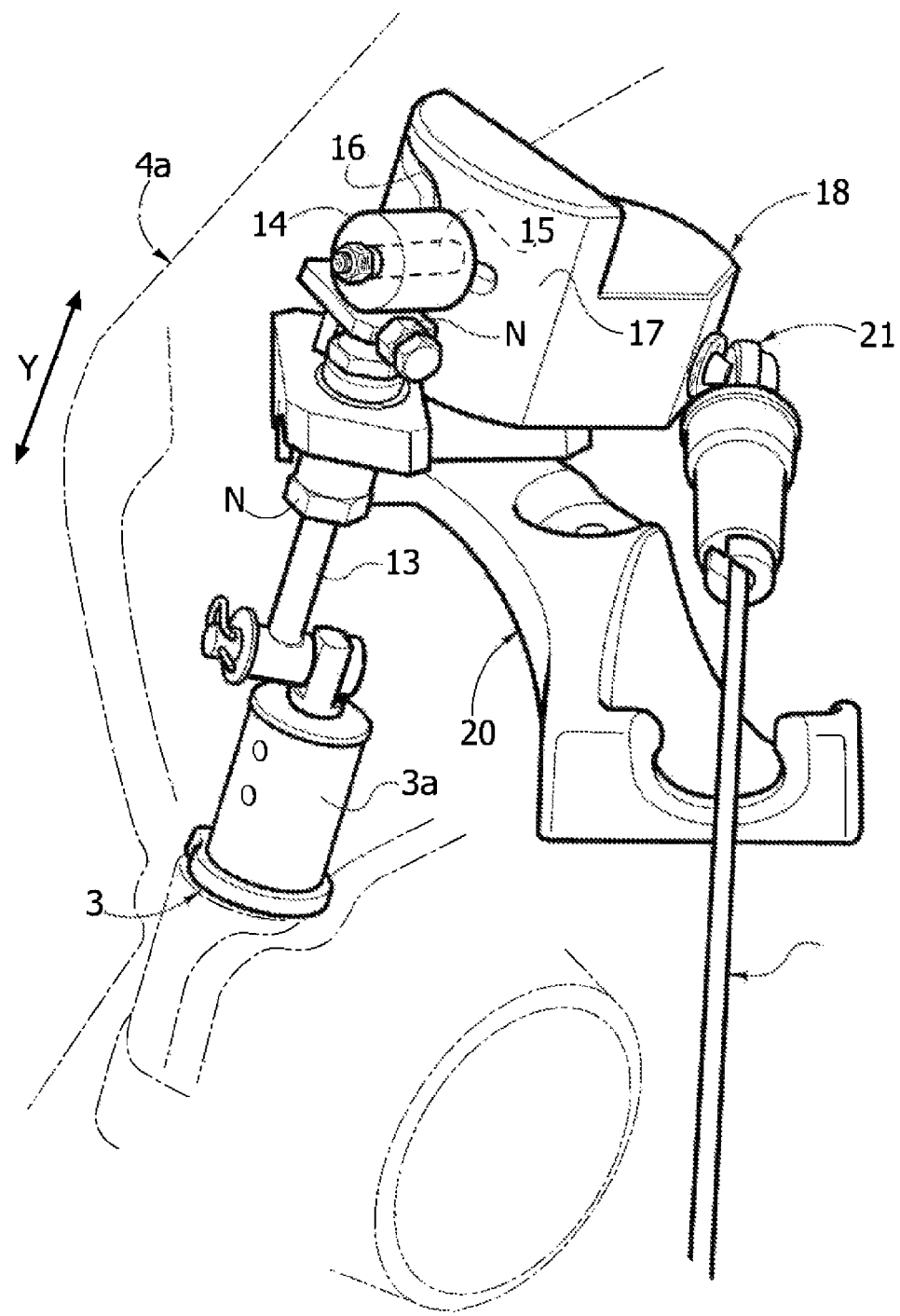
FIG. 4 shows a preferred embodiment of the present invention, in a perspective view.
Figure 5:
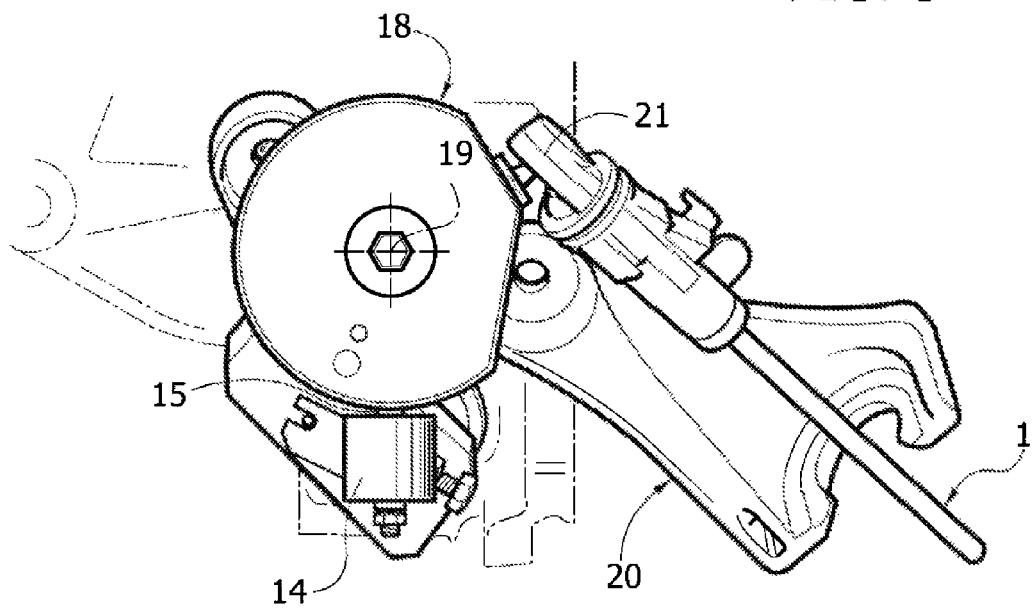
FIG. 5 is a further view of the device of FIG. 4, taken along the direction of the axis of the rotatable drum.

As shown in FIG. 4, the rigid connection between the driven member 3a and the cam-following pin 15 has adjustment screws N which enable this connection to be adapted easily and rapidly, during installation, both along the Y direction and in a direction orthogonal thereto.

Naturally, while the principle of the invention remains the same, the details of construction and the embodiments may widely vary with respect to what has been described and illustrated purely by way of example, without departing from the scope of the present invention.

What is claimed is:

1. A device for controlling a device for locking a motor vehicle gear box in a parking condition, comprising:
a mechanical transmission which connects a gear change lever, which can be actuated by the driver, to a driven member which is movable between an operative position and an inoperative position, respectively for causing engagement and disengagement of a locking device which locks a motor vehicle gear box in a parking condition,
wherein said transmission comprises a rotatable drum with an external cylindrical surface having a cam-track on said external cylindrical surface cooperating with a cam-following element.

2. The device according to claim 1, wherein said drum is rotatably mounted on a supporting bracket provided with means for connection to the casing of the gear change.

3. The device according to claim 1, wherein said rotatable drum is provided at its periphery with a connecting joint for connection to one end of said transmission.

4. The device according to claim 1, wherein said transmission comprises a flexible cable.

5. The device according to claim 1, wherein said cam-following member comprises a pin carried by a body rigidly connected to said driven member with the aid of screw means for adjustment of the relative position between said cam-following element and said driven member along two mutually orthogonal directions.

6. The device according to claim 1, wherein said cam-track is shaped so as to cause engagement of the locking device when said mechanical transmission is pulled backwardly at its end connected to the gear change lever.

7. The device according to claim 1, wherein said rotatable drum has a cam-track shaped so as to cause engagement of the locking device when the mechanical transmission is pushed forwardly at its end connected to the gear change lever.

8. The device according to claim 2, wherein said cam-track is shaped so as to cause engagement of the locking device when said mechanical transmission is pulled backwardly at its end connected to the gear change lever.

9. The device according to claim 3, wherein said cam-track is shaped so as to cause engagement of the locking device when said mechanical transmission is pulled backwardly at its end connected to the gear change lever.

10. The device according to claim 4, wherein said cam-track is shaped so as to cause engagement of the locking device when said mechanical transmission is pulled backwardly at its end connected to the gear change lever.

11. The device according to claim 5, wherein said cam-track is shaped so as to cause engagement of the locking device when said mechanical transmission is pulled backwardly at its end connected to the gear change lever.

12. A device for controlling a device for locking a motor vehicle gear box in a parking condition, comprising:
a transmission which connects a gear change lever actuatable by a driver to a driven member which is movable between an operative position and an inoperative position, which causes engagement and disengagement of a locking device of a motor vehicle gearbox,
a rotatable drum having a connecting joint connected to an end of said transmission, said drum comprising a cylindrical surface having a cam-track cooperating with a cam-following element.

* * * * *